(12) United States Patent
Lee

(10) Patent No.: US 6,955,457 B2
(45) Date of Patent: Oct. 18, 2005

(54) CONNECTING ASSEMBLY OF A HIGH MOUNTED STOP LAMP

(75) Inventor: Gi Jong Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 132 days.

(21) Appl. No.: 10/646,880

(22) Filed: Aug. 22, 2003

(65) Prior Publication Data

US 2004/0100801 A1 May 27, 2004

(30) Foreign Application Priority Data

Nov. 23, 2002 (KR) ...................... 10-2002-0073335

(51) Int. Cl.[7] .............................. F21V 1/00; F21V 7/04
(52) U.S. Cl. ...................... 362/549; 362/386; 362/396; 362/541
(58) Field of Search ................................ 362/549, 386, 362/382, 396, 523, 285, 288, 368, 541, 546, 362/457, 499

(56) References Cited

U.S. PATENT DOCUMENTS

| 4,736,279 A | * | 4/1988 | Yamai et al. ................ 362/549 |
| 5,272,602 A | * | 12/1993 | Sasajima et al. ............. 362/549 |
| 5,289,353 A | * | 2/1994 | Sasajima et al. ............. 362/549 |

FOREIGN PATENT DOCUMENTS

| JP | 03-190321 | | 7/1991 |
| JP | 4-143133 | * | 5/1992 |
| JP | 5-35485 | * | 5/1993 |

* cited by examiner

Primary Examiner—John Anthony Ward
Assistant Examiner—Bao Q. Truong
(74) Attorney, Agent, or Firm—Morgan Lewis & Bockius LLP

(57) ABSTRACT

The present invention relates to a connecting assembly for a high mounted stop lamp. The high mounted stop lamp according to an embodiment of the present invention employs a clamping clip and a guide clip so that it can readily attach to the stop lamp without using tools such as a screw driver or a spanner. In particular, the clamping clip of the present invention is provided with a clamping means that firmly fix the high mounted stop lamp to a package tray by spring force. Further, the guide clip employs a simple insert-locking system.

7 Claims, 5 Drawing Sheets

CONNECTING ASSEMBLY OF A HIGH MOUNTED STOP LAMP

FIELD OF THE INVENTION

The present invention relates to a high mounted stop lamp, more particularly to a connecting assembly of a high mounted stop lamp, which can be easily attached and detached.

BACKGROUND OF THE INVENTION

Conventionally, automobiles are provided with a stop lamp so that application of a brake system in a car ahead can be easily perceived by a driver following behind. Because a stop lamp is generally combined together with a tail lamp, drivers following behind sometimes have a difficulty at night in determining if the light of the stop lamp in an automobile ahead is lit when the tail lamp is also lit up. For example, it may be difficult to notice the application of the brake system in the distance when the light of the stop lamp is dim. As a result, there is a risk of rear-end collision when a driver fails to perceive the correct distance between cars when brake system is suddenly applied while driving at high speeds. In order to overcome the above-described drawback, some conventional vehicles are additionally provided with a high mounted stop lamp so that the driver following behind can instantly notice the application of the brake system in the distance and respond appropriately.

SUMMARY OF THE INVENTION

Embodiments of the present invention provide a connecting assembly of a high mounted stop lamp, which can be easily attached or detached without using additional tools such as a screwdriver or a spanner. One embodiment of the present invention provides a high mounted stop lamp in which a clamping clip is inserted into an inserting hole formed in a package tray. The clip clamps the package tray by means of spring force and a cramping means equipped thereon. A guide clip is inserted into an inserting hole formed in a package tray, and is simply fitted thereinto.

Preferably, the clamping clip comprises a mounting boss; a clip body having a sitting flange for a spring at the lower part thereof; a clamping disk as the clamping means, slideabley engaged to said clip body in a vertical direction; a spring disposed between said sitting flange and said clamping disk for elastically supporting said clamping disk; and a cam rotatably installed to said mounting boss, which selectively presses an upper surface of said clamping disk. When the clamping disk is released from the restriction of the cam, the clamping disk securely clamps a package tray by spring force between the mounting boss and the clamping disk.

Further, a preferred embodiment of the present invention includes inserting holes having a contour of combined circles having two different radii.

In an alternative embodiment of the invention, a stop lamp mounting assembly includes a mounting boss adapted to be secured to the stop lamp. A clip body extends from the mounting boss. A clamping member is slideably mounted on the clip body. A biasing element acts between the clip body and clamping member to bias the clamping member toward the mounting boss. A cam is mounted on the mounting boss and acts against the clamping member in a first position to limit movement thereof. The cam is configured and dimensioned to be actuated to a second position by a separate stop lamp support structure such that the support structure is clamped between the clamping member and the mounting boss under the force of the biasing element.

Preferably, the separate support structure comprises a package tray having an opening therein for receiving the clip body. In a further preferred embodiment, the opening has a first section of larger radius and a second section of smaller radius. The cam bears against the package tray in the first position when the clip body is located in the first section of larger radius and the cam moves to the second position when the clip body is moved to the second section of smaller radius.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Hereinafter, a preferred embodiment of the present invention is described in detail with reference to the accompanying drawings.

Figure 1:
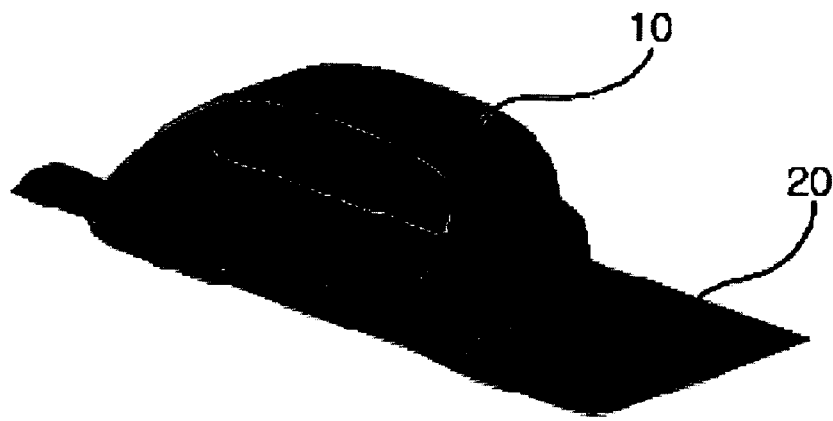
FIG. 1 is a perspective view showing an embodiment of a high mounted stop lamp of the present invention, which is inserted into a package tray.
Figure 2:
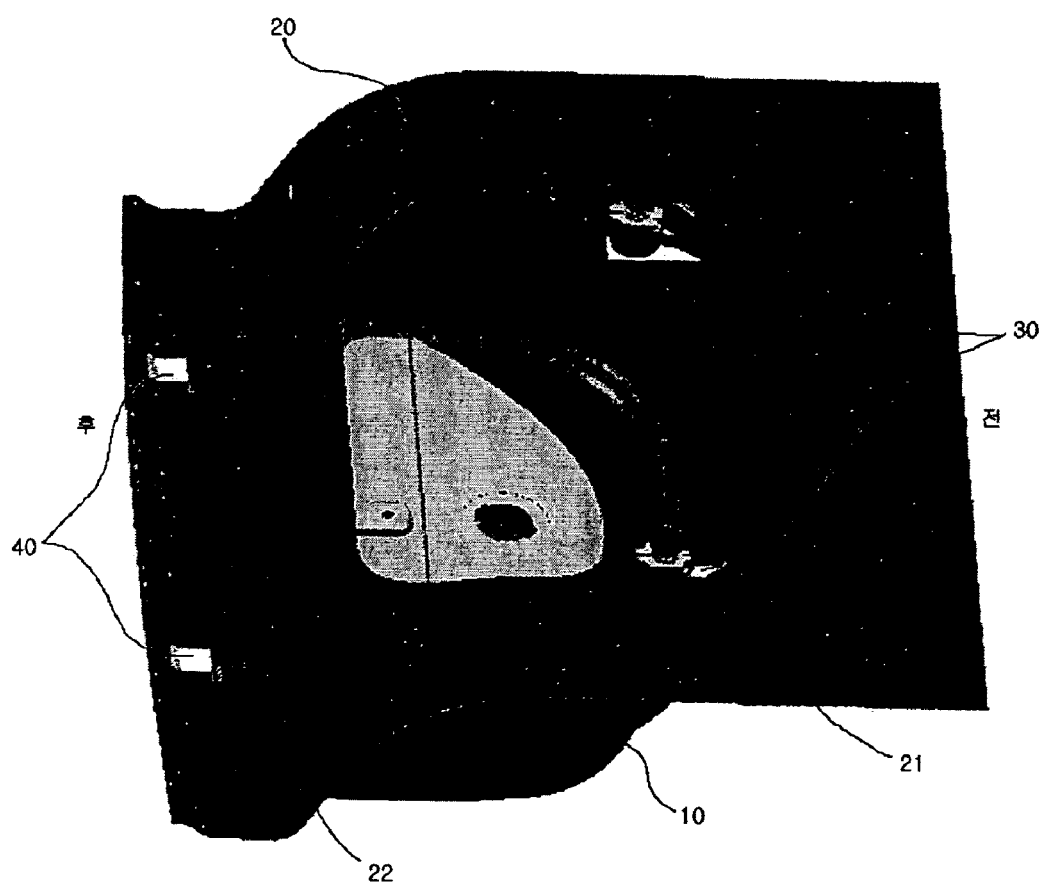
FIG. 2 is another perspective view showing an embodiment of a high mounted stop lamp of the present invention, which is inserted into a package tray.

As shown in FIG. 1, depicting a mounted state of a high mounted stop lamp according to an embodiment of the present invention, the high mounted stop lamp 10 is secured on an upper surface of package tray 20 by means of a connecting assembly (not shown in figure). FIG. 2 shows another perspective view of a mounted state of a high mounted stop lamp is adopting a downward viewpoint in order to more clearly show the connecting assembly. As shown in FIG. 2, the high mounted stop lamp 10 is secured to the package tray 20 by two clamping clips 30 at front end and two guide clips 40 at rear end. The clamping clips 30 and the guide clips 40 are disposed at the bottom part of a stop lamp cover 11 and are inserted into inserting holes for clamping clips and inserting holes for guide clips, respectively.

The clamping clip 30 is provided with a clamping means for clamping the package tray 20 after being fitted into the inserting hole 21. And the guide clip 40 is secured by fitting into inserting holes 21 and backwardly moving the cover 11.

Figure 3:
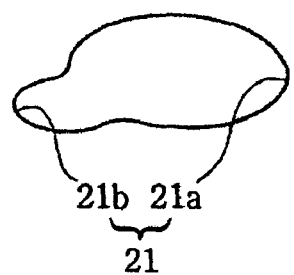
FIG. 3 is a perspective view showing an inserting hole in which a clamping clip according to an embodiment of the present invention is inserted.

As shown in the accompanying FIG. 3, depicting a shape of an inserting hole for a clamping clip, the inserting hole 21 for a clamping clip has a contour line which is formed by combining a circle 21a of large radius and a circle 21b of relatively small radius. In the installation of the high mounted stop lamp into a package tray, firstly a clamping clip is inserted into the circle 21a of big radius and is subsequently moved backward, whereby a clamping disk clamps the edge of the circle 21b of small radius.

Figure 4A:
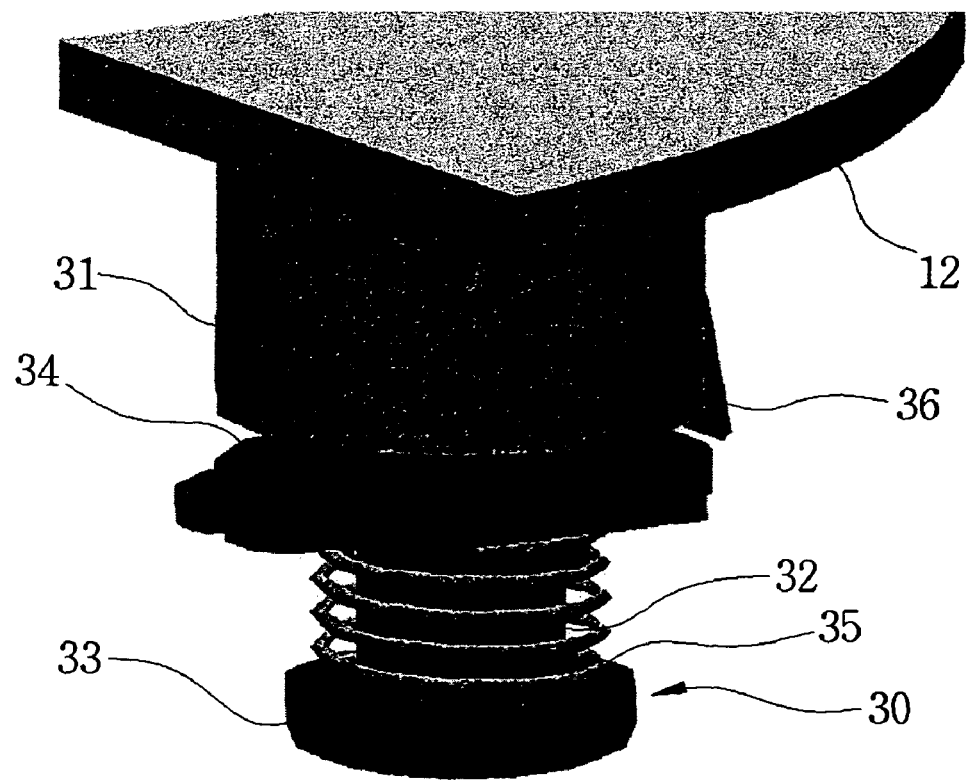
FIG. 4a is a perspective view of a clamping clip according to an embodiment of the present invention.
Figure 4B:
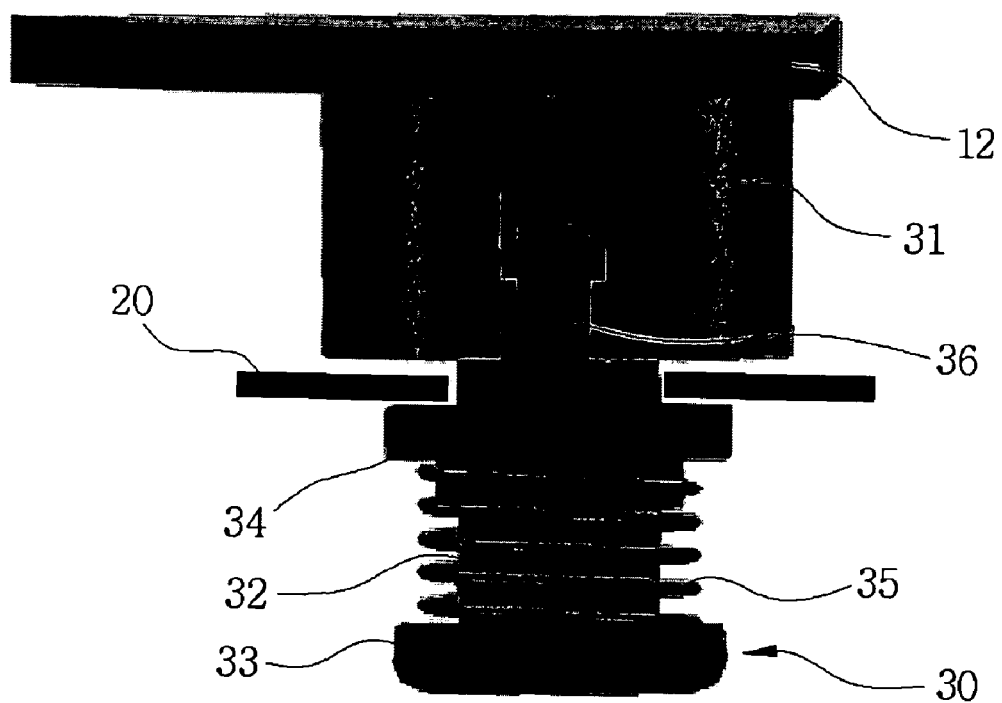
FIG. 4b is a front view of a clamping clip according to an embodiment of the present invention.

The accompanying FIG. 4a and FIG. 4b are a perspective views and a front view of a clamping clip, respectively. The clamping clip 30, inserted into an inserting hole 21 of a package tray 20, is depicted in FIG. 4b. In FIG. 4b, numeral 12 indicates a mounting bracket integrally formed inside a cover 11 of a stop lamp.

The clamping clip 30 comprises a mounting boss 31 that is secured to the mounting bracket 12 of a cover 11; a clip body 32 having a sitting flange 33 for mounting a spring at the lower part thereof; a clamping disk 34 as the clamping means, slideabley engaged to said clip body 32 in a vertical direction; a spring 35 disposed between said sitting flange 33 and said clamping disk 34 for elastically supporting said clamping disk 34; and a cam 36 rotatably installed to said mounting boss 31, which selectively presses an upper surface of said clamping disk 34.

The spring 35 disposed below the clamping disk 34 is downwardly compressed as the cam 36 rotates counterclockwise maintaining contact with the upper surface of the clamping disk 34. When the cam 36 rotates clockwise, releasing the contact with the upper surface of the clamping disk 34, the clamping disk 34 upwardly moves by spring force so that a package tray is securely fixed between the mounting boss 31 and the clamping disk 34. The fixation of a stop lamp 10 to a package tray 20 principally depends on the spring force applied to the clamping disk 34.

Figure 5A:
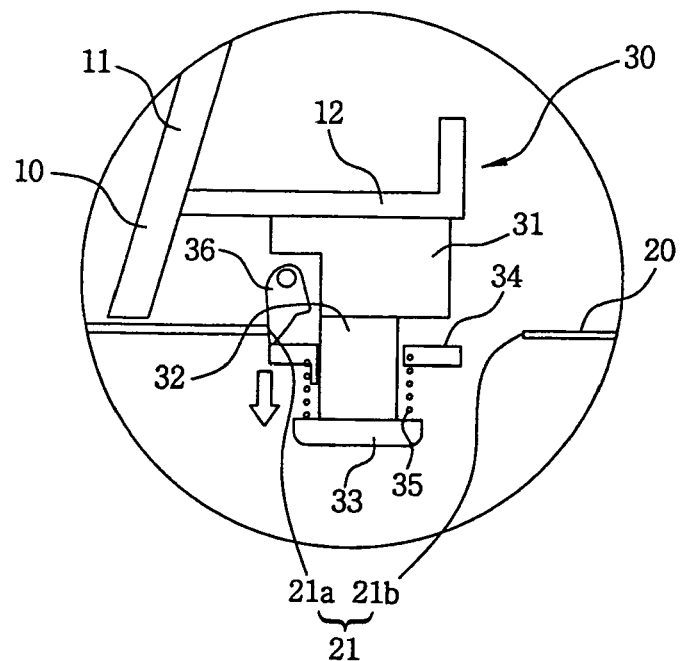
FIGS. 5a and 5b are schematic views showing a operation of a clamping clip according to an embodiment of the present invention; and, FIG. 6 is a sectional view of a high mounted stop lamp of an embodiment of the present invention, which is installed to a package tray.
Figure 5B:
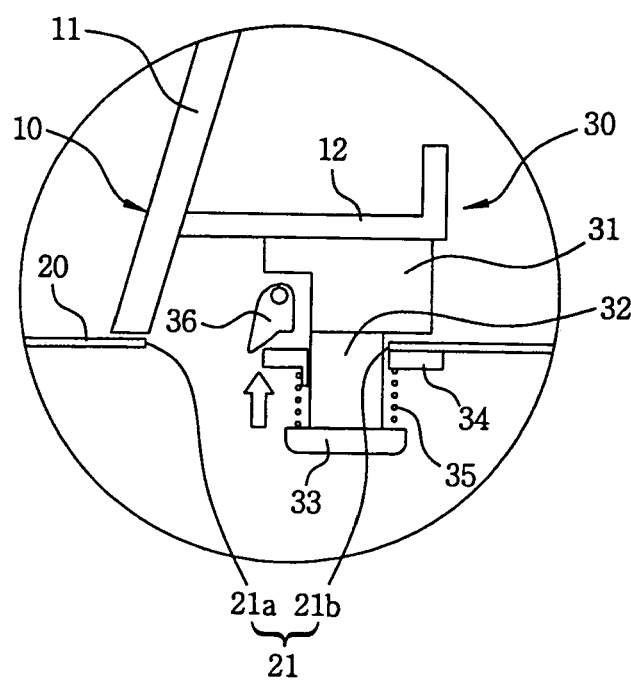

Hereinafter, an operation of a clamping clip will be described in detail with reference to the accompanying drawings, FIG. 5a and FIG. 5b.

Before the clamping clip 30 is inserted into the inserting hole 21, the cam 36 does not contact with the clamping disk 34. Namely, the clamping disk 34 is located at the highest position with no compression of the spring 35. When the clip body 32 of the clamping clip 30 is inserted into the inserting hole 21, the clip body 32 firstly passes through the large radius circle 21a. Then, the cam 36 is pressed by the edge of an inserting hole, and accordingly, rotates counterclockwise pressing the upper surface of the clamping disk 34. Therefore, the clamping disk 34 downwardly moves with compression of the spring 35. Subsequently, by moving the case 11 backwardly, the clamping clip 30 moves to the smaller radius hole 21b and the package tray 20 is inserted between the mounting boss 31 and the clamping disk 34. Simultaneously, the cam 36 restricted by the edge of large radius hole 21a is released from the restriction, whereby the clamping disk 34 restricted by the cam 36 upwardly moves by means of spring force. Finally, as shown in FIG. 5b, the package tray 20 is fixed between the mounting boss 31 and the clamping disk 34 by elastic force of the spring, so that the cover 11 of a stop lamp can be securely attached to the package tray 20 by means of the clamping clip 30.

Figure 6:
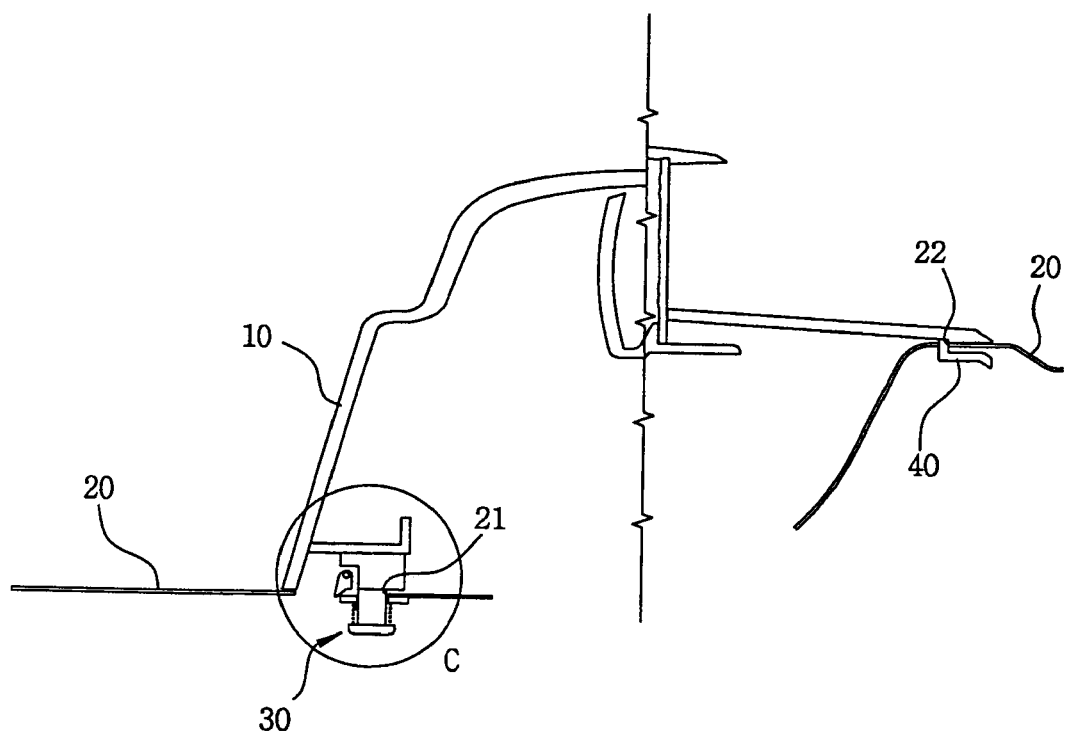

As shown in FIG. 6, the high mounted stop lamp is attached to a package tray by means of two clamping clips 30 at front end and two guide clips 40 at rear end. The guide clip 40 has a L-shape whereby once the guide clip 40 is inserted into the hole, the case 11 is not easily detached from the package tray 20. Further, the end of the guide clip 40 is slightly bent downwardly in order to facilitate entry into the inserting hole. In the installing process of the high mounted stop lamp, the clamping clips and guide clips are simultaneously inserted into the inserting holes 21 and 22, respectively. Thereafter, by backwardly moving the case 11 of the stop lamp, not only the clamping clips firmly clamp the package tray in the manner described above, but also the guide clips are immovably fixed in the inserting hole 22.

As described above, the connecting assembly of the high mounted stop lamp according to the present invention enables to readily attach a stop lamp to a package tray or detach the stop lamp for repair without using additional tools such as a screwdriver or a spanner by employing a clamping clip having a clamping means.

What is claimed is:

1. A connecting assembly for a high mounted stop lamp comprising:
    a clamping clip inserted into an inserting hole formed in a package tray and a cover of the high mounted stop lamp is firmly fixed to said package tray by means of spring force; and
    a guide clip employing an insert-locking system, wherein said clamping clip and said guide clip are installed to said cover of the high mounted stop lamp, respectively, wherein said clamping clip comprises:
    a mounting boss disposed at the lower part of said cover of said high mounted stop lamp;
    a clip body having a sitting flange for mounting a spring at the lower part thereof, the clip body being located below said mounting boss;
    a clamping disk, as a clamping means, slideabley engaged to said clip body in a vertical direction;
    a spring disposed between said sitting flange and said clamping disk for elastically supporting said clamping disk; and
    a cam rotatably installed to said mounting boss, which selectively presses an upper surface of said clamping disk,
        whereby said package tray is firmly fixed between said mounting boss and said clamping disk by spring force when said cam releases the restriction applied to said clamping disk.

2. A connecting assembly for a high mounted stop lamp according to claim 1, wherein said inserting hole for said clamping clip has a contour line which is formed by combining two circles of different radii.

3. A connecting assembly for a high mounted stop lamp according to claim 1, wherein said guide clip has a L-shape whereby once the guide clip is inserted into a hole the high mounted stop lamp is not easily detached from a package tray.

4. A connecting assembly for a high mounted stop lamp according to claim 3, wherein one end of said guide clip is slightly bent downwardly in order to facilitate entry into said inserting hole.

5. A stop lamp mounting assembly, comprising:
    a mounting boss adapted to be secured to the stop lamp;
    a clip body extending from said mounting boss;
    a clamping member slideably mounted on the clip body;
    a biasing element acting between the clip body and clamping member to bias the clamping member toward the mounting boss; and
    a cam mounted on the mounting boss and acting against the clamping member in a first position to limit movement thereof, said cam being configured and dimensioned to be actuated to a second position by a separate stop lamp support structure such that said structure is clamped between the clamping member and the mounting boss under the force of the biasing element.

6. The stop lamp mounting assembly of claim 5, wherein said separate support structure comprises a package tray having an opening therein for receiving said clip body.

7. The stop lamp mounting structure of claim 6, wherein:
said opening has a first section of larger radius and a second section of smaller radius; and
said cam bears against the package tray in said first position when the clip body is located in the first section of larger radius and said cam moves to the second position when the clip body is moved to the second section of smaller radius.

* * * * *